United States Patent
Adams et al.

(10) Patent No.: US 12,000,268 B2
(45) Date of Patent: Jun. 4, 2024

(54) HYDRAULIC PRESSURE TESTING SYSTEM, AND METHOD OF TESTING TUBULAR PRODUCTS

(71) Applicant: Adams Testing Services, Inc., Dickinson, ND (US)

(72) Inventors: Dustin J. Adams, Dickinson, ND (US); Dylan J. Adams, Dickinson, ND (US)

(73) Assignee: Adams Testing Services, Inc., Dickinson, ND (US)

( * ) Notice: Subject to any disclaimer, the term of this patent is extended or adjusted under 35 U.S.C. 154(b) by 10 days.

(21) Appl. No.: 18/057,702

(22) Filed: Nov. 21, 2022

(65) Prior Publication Data

US 2023/0083391 A1 Mar. 16, 2023

Related U.S. Application Data

(63) Continuation-in-part of application No. 17/133,816, filed on Dec. 24, 2020, now Pat. No. 11,506,050.
(Continued)

(51) Int. Cl.
| | | |
|---|---|---|
| *E21B 47/117* | (2012.01) | |
| *E21B 47/06* | (2012.01) | |
| *E21B 49/00* | (2006.01) | |

(52) U.S. Cl.
CPC ............ *E21B 47/117* (2020.05); *E21B 47/06* (2013.01); *E21B 49/008* (2013.01)

(58) Field of Classification Search
CPC ...... E21B 47/117; E21B 43/128; E21B 47/06; E21B 49/008; E21B 17/02; G01M 3/28
See application file for complete search history.

(56) References Cited

U.S. PATENT DOCUMENTS

| | | |
|---|---|---|
| 3,503,249 A | 3/1970 | Dumond |
| 5,195,588 A | 3/1993 | Dave |

(Continued)

OTHER PUBLICATIONS

Screen shot of Hydrostatic Tubing Testing; http://tubingtestersinc.com/services.php; Hydrostatic Tubing Testing; the screen shots reflect the website in Jan. 2021; 3 pages.
(Continued)

*Primary Examiner* — Brad Harcourt
(74) *Attorney, Agent, or Firm* — Peter L. Brewer; Thrive IP

(57) ABSTRACT

A pressure-testing system for a tubular product. Preferably, the tubular product is a joint or a stand of production tubing. The pressure testing assembly includes a controller; a fluid reservoir configured to contain a test fluid; a pump in fluid communication with the fluid reservoir; a fluid hose having a first end configured to receive the test fluid from the reservoir, and a second end configured to be fluidically connected to a hydrotest tool for the tubular product; and a transducer. The transducer sends signals to the controller indicative of pressure within the fluid hose. The controller is programmed to automatically (i) store a pressure threshold value (T) and (ii) store a pressure test value ($P_T$) such that when pressure in the fluid hose reaches (T) or when pressure in the fluid hose reaches ($P_T$), the controller sends a signal to a diverter to divert a direction of fluid being pumped so that fluid is no longer pumped into tubular product.

16 Claims, 7 Drawing Sheets

Related U.S. Application Data

(60) Provisional application No. 62/966,220, filed on Jan. 27, 2020, provisional application No. 62/922,235, filed on Dec. 27, 2019.

(56) References Cited

U.S. PATENT DOCUMENTS

| | | |
|---|---|---|
| 7,650,936 B2 | 1/2010 | McGuire et al. |
| 7,828,053 B2 | 12/2010 | McGuire et al. |
| 7,896,087 B2 | 3/2011 | Dallas |
| 8,151,628 B1 | 4/2012 | Smida |
| 8,205,916 B2 | 6/2012 | Dallas et al. |
| 8,683,848 B1 | 4/2014 | Taft et al. |
| 9,909,948 B1 | 3/2018 | Stewart |
| 10,458,228 B2 | 10/2019 | Jin et al. |
| 2004/0231856 A1 | 11/2004 | Dallas et al. |
| 2005/0172720 A1 | 8/2005 | Schmitt-Thomas |
| 2006/0005610 A1 | 1/2006 | Makogon |
| 2008/0184796 A1 | 8/2008 | Smida et al. |
| 2009/0091131 A1 | 4/2009 | Dallas et al. |
| 2010/0050762 A1 | 3/2010 | Nold et al. |
| 2012/0174654 A1 | 7/2012 | Smida |
| 2012/0255345 A1 | 10/2012 | Golinveaux et al. |
| 2013/0213121 A1 | 8/2013 | Sundholm |
| 2014/0299327 A1 | 10/2014 | Berube et al. |
| 2014/0305640 A1 | 10/2014 | Wellington et al. |
| 2015/0035238 A1 | 2/2015 | Hart et al. |
| 2015/0128693 A1 | 5/2015 | Franklin et al. |
| 2015/0362114 A1 | 12/2015 | Berube et al. |
| 2016/0031638 A1 | 2/2016 | Noyon |
| 2016/0370249 A1 | 12/2016 | Hart et al. |
| 2017/0212535 A1 | 7/2017 | Shelman et al. |
| 2017/0255192 A1 | 9/2017 | Thwaites et al. |
| 2017/0268313 A1 | 9/2017 | Harris et al. |
| 2018/0163506 A1 | 6/2018 | Montoya et al. |
| 2019/0078964 A1 | 3/2019 | Miller |
| 2019/0264536 A1 | 8/2019 | Abeidoh et al. |
| 2020/0165895 A1 | 5/2020 | Hiorth |
| 2020/0256754 A1 | 8/2020 | Hart et al. |
| 2021/0108467 A1 | 4/2021 | Arteaga et al. |
| 2021/0108469 A1 | 4/2021 | Gullaksen et al. |

OTHER PUBLICATIONS

Screen shot of Hydrostatic Testing; https://www.greenesenergy.com/products-services/well-testing-services/hydrostatic-testing/; the screen shots reflect the website in Jan. 2021; 3 pages.

Screen shot of Tubing Test Cups; https://oilstates.com/onshore/well-servicing-products/tubing-test-cups-osi/; the screen shots were taken in Feb. 2023; 2 pages.

Screenshots taken from Mathews Machine & Hydraulics website at www.mathewsmachine.com; the screen shots were taken in Feb. 2023, 8 pages.

Screenshots taken from Mathews Machine & Hydraulics Linkedin brochure at www.online.flihtml5.com, published May 27, 2022, the screen shots were taken in Feb. 2023; 11 pages. Applicant believes that the new system, described in the Mathews Machine LinkedIn announcement last May, is a copycat design of Applicant's system.

HYDRAULIC PRESSURE TESTING SYSTEM, AND METHOD OF TESTING TUBULAR PRODUCTS

CROSS REFERENCE TO RELATED APPLICATIONS

This application is filed as a Continuation-in-Part of U.S. Ser. No. 17/133,816 entitled "A Hydraulic Pressure Testing System, and Method of Testing Tubular Products." That application was filed on Dec. 24, 2020 and will issue as U.S. Pat. No. 11,506,050.

This application claims the benefit of U.S. Ser. No. 62/922,235 filed Dec. 27, 2019. That application is titled "Hydraulic Pressure Testing System, and Method of Testing Tubular Products."

This application claims the benefit of U.S. Ser. No. 62/966,220 filed Jan. 27, 2020. That application is titled "A Hydraulic Pressure Testing System, and Method of Testing Tubular Products."

Each of these applications in incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to systems for testing tubular products used to transport fluids. The present invention also relates to the field of hydrocarbon recovery operations, and the testing of tubular joints used to move fluids up a wellbore. In other aspects, the invention relates to a mobile hydraulic pressure testing system, and a method for testing tubular products such as production tubing at a well site.

Technology in the Field of the Invention

As part of the completion process for an oil and gas well, a string of production tubing is lowered into the wellbore. The string of production tubing comprises a number of joints threadedly connected end-to-end. Each joint is typically 30 feet (or 9.1 meters) in length.

In order to run the production tubing into the wellbore, joints of tubing are picked up using a winch line. The joints of tubing are then vertically placed over a wellhead above the wellbore. The wellhead includes a so-called tubing head. The tubing head defines a cylindrical bore that is dimensioned to receive the joints of tubing as they are lowered into the wellbore. Frequently, joints of tubing are lowered into the tubing head two at a time, meaning that 60-foot (18.3 meter) sections of pipe are handled in stages.

During completion, the pin end of each joint (or two-joint section) of tubing is lowered into the box end of a preceding joint (or two-joint section) of tubing. This may be done using a workover rig after the drilling rig has been removed from the wellsite. Alternatively, joints of tubing may be run into a cased wellbore using the drilling rig itself. In any event, joints of tubing are suspended over the wellbore, and then rotated using a pneumatic connector (usually referred to as tongs) at the surface until a secure mechanical connection is made. In this way, the joint (or two-joint section) of tubing becomes a part of the tubing string within the wellbore.

Upon being connected to the tubing string, the joint (or two section) of tubing is lowered through the tubing head and into the wellbore until it is in position to receive a next joint of tubing. This procedure is repeated until the entire string of production tubing is suspended. The last joint of tubing is a so-called tubing hanger, which is a shorter tubular body having an enlarged, circumferential shoulder at the top. The circumferential shoulder is landed on an upper beveled shoulder residing along an inner diameter of the tubing head.

During this process, it is desirable for the operator to ascertain the integrity of each joint of tubing before it is completely lowered through the tubing head. For this, a pressure test is conducted. The pressure test is used to determine whether each joint is able to hold pressure, or whether it has possibly developed so-called pinhole leaks or fatigue cracks or is otherwise unable to provide a fluid seal in the wellbore. This process is commonly referred to as "hydro testing."

Hydrotesting uses water that is pumped into a tubular body under pressure. As pressure builds, a gauge is monitored to determine if the tubing is watertight up to a pre-determined pressure. The desired pressure can range from 5,000 to 15,000 psig, but is typically around 7,000 psig.

FIG. 1 is a schematic view of a known hydrotest system 100 as used for the pressure-testing of production tubing. In FIG. 1, production tubing is shown in vertical orientation at 110. The production tubing 110 may represent a single joint of tubing; alternatively, the production tubing 110 may represent two or even three joints of tubing threadedly connected in series as a section.

The production tubing 110 offers an upper end 112 and a lower end 114. The upper end 112 represents a so-called box end while the lower end 114 is a so-called pin end. An elongated bore 115 is provided from the upper end 112 to the lower end 114. Those of ordinary skill in the art will understand that the production tubing 110 is intended to be run into a wellbore and to then transport production fluids from a subsurface pay zone up to the surface. Frequently, production equipment such as a string of sucker rods and a traveling valve (not shown) will reside in and will be cyclically raised and lowered within the bore 115 during a pumping operation.

As noted above, it is known to test joints of tubing as they are being run into a wellbore as part of the completion operation. Alternatively, the production tubing 110 may be pressure tested as it is being removed from a wellbore, such as when a downhole pump is being repaired or replaced. In either instance, the operator will employ a hydrotest tool, shown at 120 in FIG. 1.

The hydrotest tool 120 represents a series of bars connected end-to-end, forming an elongated mandrel 125. The bars are connected using threaded connections. The mandrel has an upper end 122 (or pressure head) and a lower end 124. Each end 122, 124 is fitted with elastomeric material used for sealing a respective end 112, 114 of the production tubing 110. In this respect, the elongated mandrel 125 is run into the joints of tubing 110 within a wellbore.

The elastomeric material at the opposing ends 122, 124 may represent upper 126' and lower 126" packer elements. The packer elements 126', 126" are extruded outwardly in response to pneumatic or hydraulic pressure. In one aspect, the elastomeric material represents so-called seal cups or test cups that expand in response to water being pumped into the bore 115. The test cups are essentially a series of shaped rubber gaskets.

One or more hose fittings 128 is provided at an end 122 of the hydrotest tool 120. Hoses 152, 154 are unspooled and connected to the hose fittings 128. Opposite ends of the hoses 152, 154 run to a pump assembly 140. Optionally, both hoses 152, 154 are used to fill the production tubing 110 using a pump 141.

A hydrotest truck 130 is used for the pressure testing. The truck 130 carries mechanical and analog components, including the pump assembly 140. Components of the pump assembly 140 will include the pump 141, one or more analog gauges 142, 144, and hoses 146, 148. The hoses 146, 148 supply fluid from a fluid reservoir 145 and through the gauges 142, 144. Of interest, the analog gauges 142, 144 monitor fluid pressure applied to the hoses 152, 154 as fluid enters the hydrotest tool 120 and fills a stand of production tubing 110.

In FIG. 1, the fluid reservoir 145 is indicated as being in fluid communication with the pump 141. The fluid reservoir 145 and pump 141 may both reside on the hydrotest truck 130. A switch within the truck 130 allows the operator to turn the pump 141 on. Turning the pump 141 on causes fluid to be pumped from the reservoir 145, through one or both of hoses 146, 148, through hoses 152 or 154 and into the production tubing 110 to be tested. Similarly, the switch (or, optionally, a separate switch) may be used to manually turn the pump 141 off.

After pressure testing, the hoses 152, 154 are disconnected from the hydrotest tool 120 (at a location referred to as a bull plug). The bull plug is removed and the hoses 152, 154 are temporarily installed onto a pressure gun (not shown).

It is noted that the hydrotest truck 130 includes a winch 135. The winch 135 includes a motor (not shown) and a winch line (seen at 137 in FIG. 2). The winch 135 and line 137 are used for lifting the hydrotest tool 120 over and down into joints or sections of the production tubing 110 for testing. The line 137 is run up over the rig floor and through sheaves. The sheaves may be associated with a drilling rig or workover rig. The winch line 137, or cable, includes a series of slips (not shown) designed to hold the test tool 120 in place within the bore 115 during pressurization.

During operation, the slips are set in the run-in position and the test tool 120 is lowered into the tubing 110. Once the test tool 120 is in place in the tubing 110, the operator pulls up on the cable 137 to set the slips in place.

The elastomeric test cups 126', 126" are backed against stops carried on the mandrel 125. Fluid is then passed through perforations placed along the mandrel 125, allowing test fluid to fill the space between the test cups 126', 126". As the test fluid fills the space between the test cups 126', 126" under pressure, the elastomeric cups 126', 126" flare out, forming a fluid-tight seal with the internal wall of the tubing joint 110 being tested. A continued pumping of water increases the pressure on the walls of the tubing 110.

Fluid is pumped into the bore 115 of the production tubing 110 to a desired psi. Fluid is then held at pressure and monitored for a sufficient time to ensure that the production tubing 110 does not have a leak. A slow pressure drop will indicate a pinhole or fatigue crack or other defect somewhere in the tubing 110 or along the threads at ends 112 or 114.

It is up to the operator to operate the switches directing test fluid into the test tool 120, and to visually monitor the gauges 142, 144 to determine if the tubing joint 110 is holding pressure. This is a surprisingly subjective process. It is possible for a joint of production tubing to have a pinhole, allowing a slow leak to occur during pressure testing, that is missed or even ignored by the operator. Current procedures provide no charting and no record of hydrotest results for confirming that a test procedure was carried out properly.

After a joint of tubing is tested, the pressure of the test fluid is relieved, meaning that water is allowed to bleed back through one or both hoses 152, 154 and into the reservoir 145. The joint of production tubing 110 is then lowered into the wellbore with the string of production tubing 110. The slips allow the wireline 137 to lower the test tool 120 without the test tool 120 falling through the tubing 110 until the tongs grasp the top of the joint.

The cable 137 is placed into a next joint of tubing 110 to be tested. With the slips in place, the next joint of tubing is made up for a next stage of pressure testing. A wireline overshot is run into the tubing to retrieve the test tool 120 and bring it up to the next joint of tubing to be tested.

It is observed that if the operator overpressures a joint of tubing such as through carelessness, the tubing can burst and the slips can release the production tubing into the well. This requires an expensive and time consuming fishing expedition. Therefore, a need exists for an improved hydraulic pressure testing system that is automated. Further, a need exists for a hydrotest system that records pressure build-up for each test cycle, providing a chart that confirms that each joint of tubing that is lowered into the wellbore has passed the pressure test.

SUMMARY OF THE INVENTION

A pressure-testing system for a tubular product is provided herein. Preferably, the tubular product is a joint, or a stand made up of two or more joints, of production tubing. Aspects of the pressure testing system are automated, including steps related to pressurization, pressure monitoring, and depressurization.

In one aspect, the pressure-testing system first comprises a controller. The controller allows for automation of pressure testing functions. The controller is in electrical communication with a user interface that allows the operator to input values in support of the pressure testing. Those values may include:
  a pressure threshold value (T);
  a designated pressure test value ($P_T$); and
  a pressure testing time ($T_T$).

The pressure-testing system also includes a pumping system. The pumping system comprises:
  (i) a fluid reservoir;
  (ii) a pump in fluid communication with the fluid reservoir;
  (ii) a fluid hose having a first end configured to receive the test fluid from the reservoir, and a second end configured to be fluidically connected to a hydrotest tool for the tubular product; and
  (iii) a transducer configured to send signals to the controller indicative of pressure within the fluid hose, in real time Preferably, the test fluid is an aqueous fluid. During warm weather months, the test fluid is water, or brine. During the coldest weeks of the year, the test fluid will include methanol to prevent line freeze.

Preferably, the pump is a power take-off pump (or "PTO pump"). In this instance, an operating rate of the pump is adjusted by changing RPM's of an engine associated with a hydrotest truck. Alternatively, a variable frequency drive motor may be used to drive the pump.

The controller comprises memory that charts pressure history during the testing of each tubular product. Pressure is charted during the set test time ($T_T$). The controller is programmed to send a signal to the pump to discontinue pumping when pressure in the fluid hose reaches the designated pressure test value ($P_T$). The controller then watches the pressure to see if it stays within a set pressure differential ($\Delta x$).

In one aspect, the controller is programmed to:
 (i) detect whether a pressure loss of $>(\Delta x)$ occurs during the test time ($T_T$);
 (ii) in the event a pressure loss of $>(\Delta x)$ occurs, send an alert to an operator; and
 (iii) in the event a pressure loss of $>(\Delta x)$ does not occur during the test time ($T_T$), send a signal to stop the pump from pumping fluid (which may include holding pressure), and to bleed test fluid back into the fluid reservoir.

In either of instances (ii) or (iii), a digital record is made by the controller of the test stage.

As noted, the pressure-testing system operates with a user interface. The operator uses the user interface to:
 (i) set the pressure threshold value (T),
 (ii) set the pressure test value ($P_T$);
 (iii) set the test time ($T_T$); and
 (iv) set the value of the pressure differential ($\Delta x$).

In addition, the user interface provides a "Start" function enabling the operator to initiate pump operation for the pressure-testing of a joint of production tubing. This occurs once the hydrotest tool is in place within a stand of pipe. Additionally, the user interface provides an "Off" function enabling the operator to manually operate the pump without the controller. Preferably, the operator controls the pressure-testing system from inside the truck.

In one aspect, the controller has a pre-set shut-off time ($T_{SO}$). In the event the pump has been pumping for the shut-off time ($T_{SO}$), the controller sends a signal to the pump to discontinue pumping. The controller is further programmed to send a signal to the pump to discontinue pumping if pressure in the fluid hose reaches the pressure threshold value (T) during the test time ($T_T$). The controller may also send a signal to one or more control valves to re-route fluid and to relieve pressure from the production tubing being tested.

A method of pressure-testing a tubular product is also provided herein. The method uses the pressure-testing system described above in its various embodiments. Preferably, the method is used for testing joints of production tubing as they are being run into or being pulled out of a wellbore.

In one aspect, the method first comprises securing a hydrotest tool in a bore of the tubular product. The hydrotest tool may be any tool configured to be secured within a pipe body, and to receive a test fluid such as water, and then hold the test fluid within the pipe body, under pressure for a designated test time ($T_T$).

The method also includes providing a fluid pumping system. As noted above, the fluid pumping system may include a fluid reservoir, a pump, a fluid hose and a pressure transducer. In addition, a controller is provided as part of the fluid pumping system in the method.

The method further comprises providing a user interface. The user interface is in electrical communication with the controller.

Also, the method includes placing the fluid reservoir in fluid communication with the hydrotest tool by means of the fluid hose.

Additionally, the method includes the steps of:
 (i) setting a pressure test value ($P_T$) for the controller;
 (ii) setting a pressure threshold value (T) for the controller; and
 (iii) setting a pressure hold value as the test time ($T_T$) for the controller.

The method further comprises activating operation of the pump. This is done by initiating a Start function associated with the user interface. When the pump is activated, test fluid is pumped from the fluid reservoir, through the fluid hose, into the mandrel of the hydrotest tool. The test fluid is then fed into the production tubing. In one aspect, pressing the Start function activates a series of control valves that route fluid into the hydrotest tool or, alternatively, into the production tubing directly.

In one aspect, the fluid pumping system further comprises a transducer configured to send signals to the controller. The signals are digital signals that are indicative of pressure within the fluid hose. The signals are sent in real time, allowing the controller to know at all times what the fluid pressure is in the pumping system, which is indicative of pressure in the production tubing. During operation, when pressure in the fluid hose reaches ($P_T$), the controller sends a signal to the pump to discontinue pumping, or to at least hold pressure. Pressure may be held over the test time ($T_T$).

In the unlikely event of a pressure spike in the system that causes the pressure to reach (T), the controller sends a second signal to the pump to discontinue pumping. Alternatively, the controller sends a signal to one or more control valves to re-route fluid away from the hydrotest tool and back into the fluid reservoir.

The controller itself comprises memory. The memory charts pressure history during pressure testing of each tubular product during the test time ($T_T$). In one aspect, the controller is programmed to:
 (i) detect whether a pressure loss of $>(\Delta x)$ occurs during test time ($T_T$);
 (ii) in the event a pressure loss of $>(\Delta x)$ occurs, record the pressure loss and, optionally, send an alert to an operator; and
 (iii) in the event a pressure loss of $>(\Delta x)$ does not occur during the test time ($T_T$), send a signal to stop the pump from pumping fluid and to bleed test fluid back into the reservoir.

Over the life of a pipe testing operation, the controller may generate a histogram. The histogram provides a visual presentation of pressure-up, pressure-hold, and pressure-bleed cycles for each joint of pipe. In one aspect, the operator enters a stand value for each test cycle, which is also held in memory. In other words, joints of pipe are correlated to the pipe test for each test time ($T_T$).

The method further comprises setting ($\Delta x$) for the controller, and also setting a pre-set shut-off time ($T_{SO}$). During the pumping, the controller will monitor transducer signals to determine whether the pressure threshold value (T) has been reached in the joint of production tubing within the pump shut-off time ($T_{SO}$). If (T) has not been reached within the pump shut-off time ($T_{SO}$), the pump continues to pump the test fluid until pressure ($P_T$) is reached. If (T) has been reached at any time, the controller immediately shuts off the pump and bleeds off the test fluid from the joint of production tubing back into the fluid reservoir.

In one aspect, the method further includes positioning the joint of production tubing over a wellbore before securing the hydrotest tool to the bore of the joint of production tubing. The method then includes initiating pumping of the test fluid through the fluid hose and into the joint of production tubing. During testing, the operator may adjust an operating speed of the pump by changing RPM's of an engine associated with a hydrotest truck.

In the unlikely event the pump continues pumping until the shut-off time ($T_{SO}$) has been reached, meaning that the desired test pressure ($P_T$) within the production tubing is not being achieved, then the controller sends a signal to the pump to discontinue pumping. The controller will register this event as well, indicating a tubing defect.

BRIEF DESCRIPTION OF THE DRAWINGS

So that the manner in which the present inventions can be better understood, certain illustrations are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
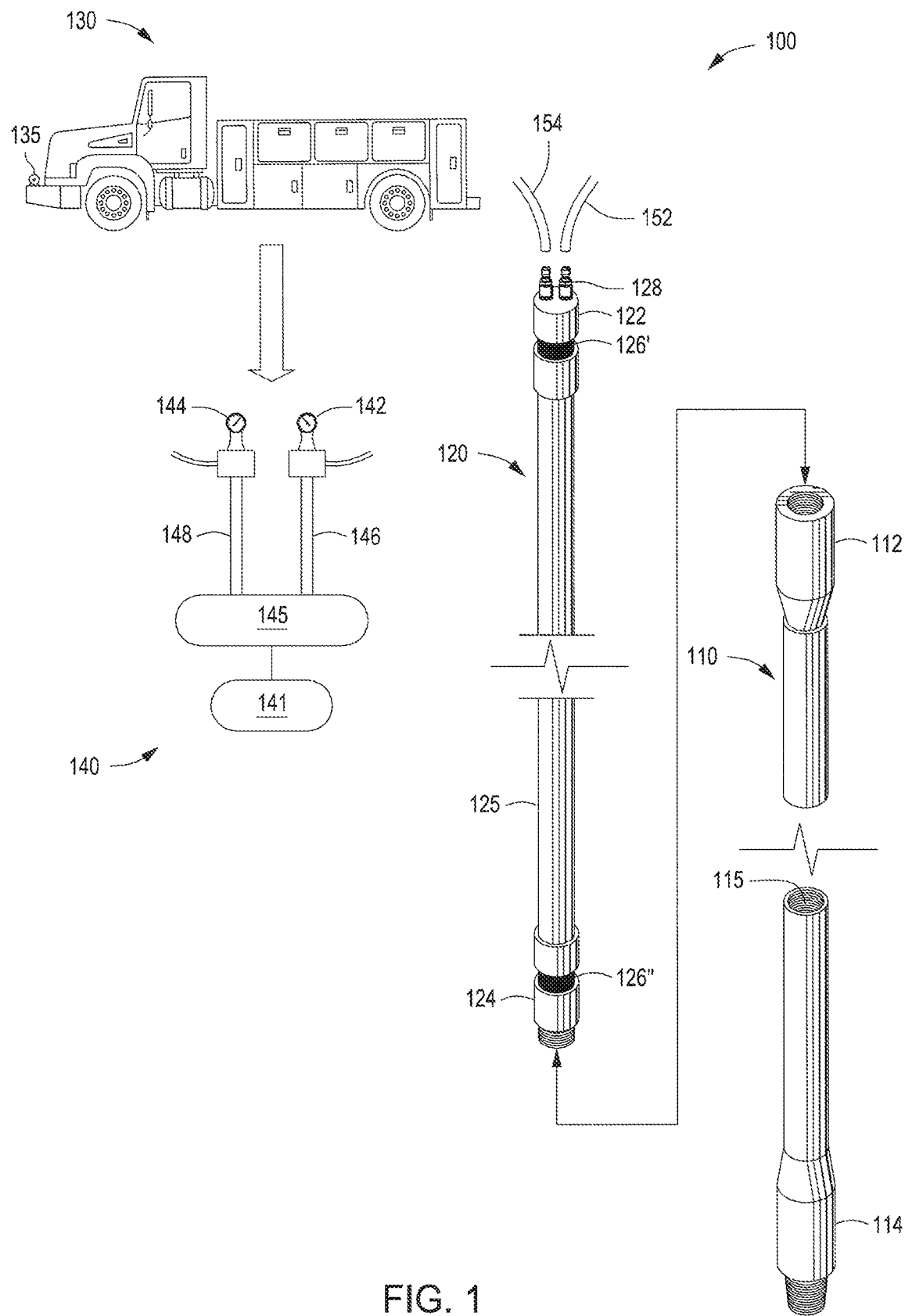
FIG. 1 is a schematic view of a known hydrotest system for a joint or section of production tubing. Analog gauges are seen for monitoring fluid pressure applied to the tubing through a hydrotest tool.

For purposes of the present application, it will be understood that the term "hydrocarbon" refers to an organic compound that includes primarily, if not exclusively, the elements hydrogen and carbon. Hydrocarbons may also include other elements such as, but not limited to, halogens, metallic elements, nitrogen, oxygen, and/or sulfuric components.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and water.

As used herein, the term "fluid" refers to gases, liquids, and combinations of gases and liquids, as well as to combinations of gases and solids, combinations of liquids and wellbore fines, and combinations of gases, liquids, and fines. In the context of hydro-testing of tubular products, the test fluid may be, for example, potable water, brine, or water with methanol.

As used herein, the term "wellbore fluids" means water, hydrocarbon fluids, formation fluids, or any other fluids that may be within a wellbore during a production operation.

As used herein, the term "gas" refers to a fluid that is in its vapor phase.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types. A formation that produces hydrocarbon fluids in commercially-viable quantities may be referred to as a "pay zone."

As used herein, the terms "communication line" or "communications link" refer to any line capable of transmitting signals or data. The terms also refer to any insulated line capable of carrying an electrical current, such as for power. The terms may also refer to a wireless network or link.

As used herein, the term "tubing" refers to a joint of pipe, or to a series of pipe joints threadedly connected end-to-end. The tubing may be used to product hydrocarbon fluids from a wellbore, or to inject a fluid such as $CO_2$, steam or water as part of enhanced oil recovery, or sequestration.

As used herein, the term "wellbore" refers to a hole in the subsurface made by drilling or insertion of a conduit into the subsurface. A wellbore may have a substantially circular cross section, or other cross-sectional shapes. The term "well," when referring to an opening in the formation, may be used interchangeably with the term "wellbore."

Description of Selected Specific Embodiments

Figure 2:
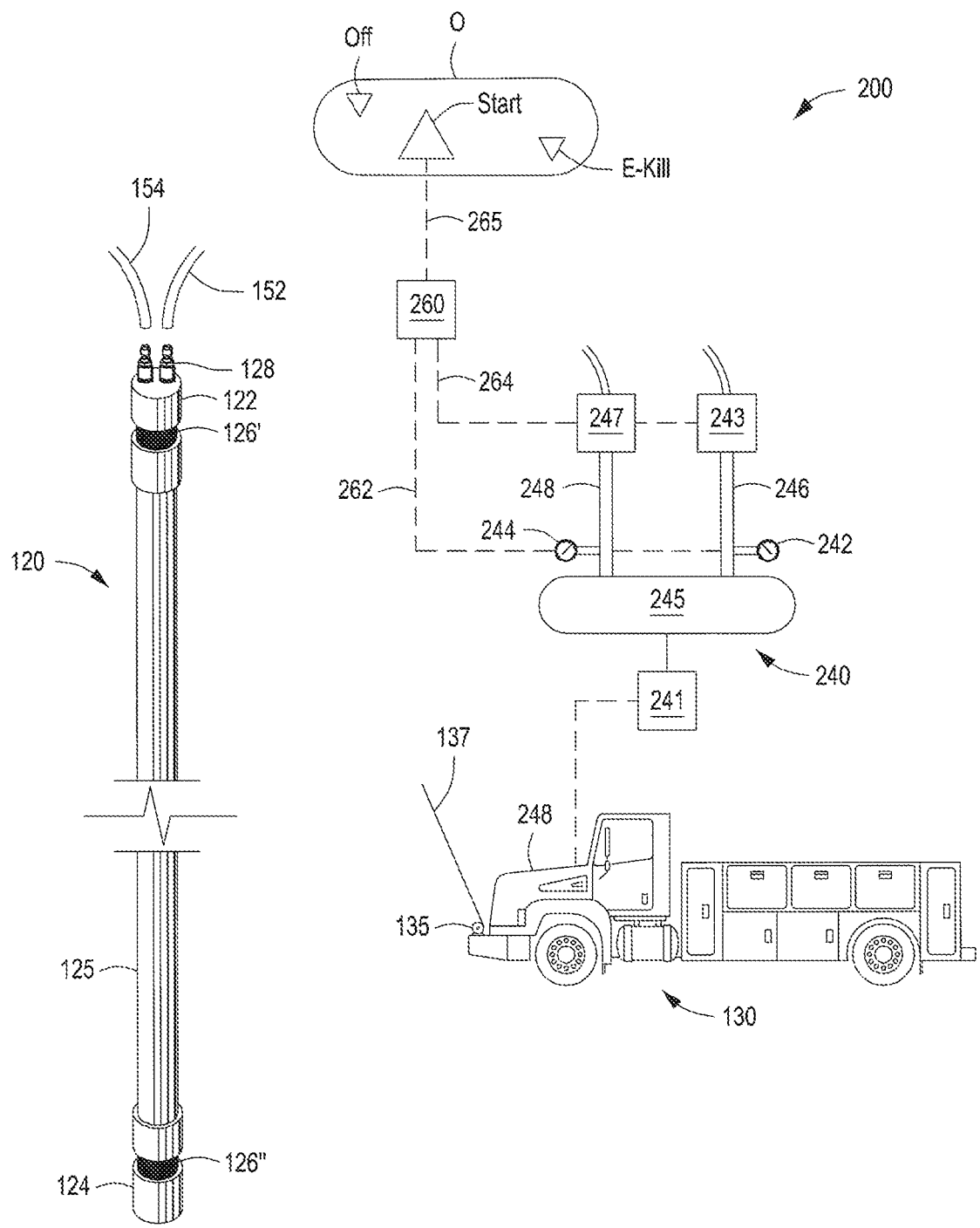
FIG. 2 is a schematic view of the hydrotest system of the present invention, in one embodiment. Here, a controller is used to monitor and record fluid pressure applied to the tubing through the hydrotest tool.

FIG. 2 is a schematic view of a hydrotest system 200 of the present invention, in one embodiment. As with the hydrotest system 100 described above, the hydrotest system 200 employs a hydrotest tool 120 in order to pressure-test a tubular body (such as production tubing 110 of FIG. 1). However, the present system 200 utilizes a controller 260 to monitor pressure in fluid hoses 246, 248 and optionally to provide instructions to a safety valve 243 that can partially or completely close off a flow of fluid.

During operation, the hydrotest tool 120 is run into the bore 115 of the production tubing 110 as described above. Weighted bars are used to allow the test tool 120 to gravitationally hang from the winch line 137, in tension.

As with the hydrotest system 100, the hydrotest system 200 may operate with a hydrotest truck 130. The hydrotest truck 130 carries and supports components of a novel pumping system 240. These components include a high-pressure pump 241 used for pumping water (or other aqueous fluid) as a test fluid into the test tool 120 and into the production tubing 110.

A fluid reservoir 245 is indicated as being in fluid communication with the pump 241. The fluid reservoir 245 and pump 241 may both reside on the hydrotest truck 130. A switch (shown as a Start button) within the truck 130 allows the operator to manually turn the pump 241 on. This causes fluid to be pumped from the reservoir 241, through one or both of hoses 246, 248, through hose 152 and into the production tubing 110 to be tested. Similarly, the switch (or, optionally, a separate switch) may be used to turn the pump 241 off.

In the novel pumping system 240, the pump 241 maybe a power take-off (or PTO) pump. The PTO pump 241 uses (or borrows) the engine 248 of the truck 130 as a variable-speed motor to drive RPM's, thereby adjusting the pump's stroke rate. Stated another way, the PTO pump 241 is reliant on engine RPM's off of the hydrotest truck's engine 248 to either increase speed (which in turn strokes the pump at a faster rate to generate more hydraulic pressure) or to reduce speed.

As noted, the pumping system 240 also includes one or more fluid hoses 246, 248. These hoses 246, 248 are in selective fluid communication with hose 152, used to inject test fluid into the production tubing bore 115. Each of hoses 246, 248 has a respective pressure transducer 242, 244. The pressure transducers 242, 244 convert analog pressure signals into digital signals. Those signals, indicated at dashed line 262, are sent in real time to the controller 260 during a testing operation.

In the pumping system 240, the flow of fluid from the hoses 246, 248 may also be controlled through valves 243, 247, respectively. The valves 243, 247 may be, for example, electrically actuated plug valves or poppet valves. During operation, the test fluid flows through one or both of the valves 243, 247 en route to the hose 152.

As noted, the pressure testing system 200 also includes a controller 260. In the hydrotest system 200, controller 260 is used to monitor and record fluid pressure applied to the tubing 110 through hose 152 of the hydrotest tool 120. The controller 260 represents a programmable logic controller (or PLC), or optionally an embedded controller, or any controller suitable for the oil well applications environments. In one aspect, the controller 260 is capable of performing proportional-integral-derivative (PID) loop control or a subset such as PI loop controls. This enables multiple data signals to be processed and analyzed in real time. If the process controller is a PLC, the programming language is typically ladder logic. In the case of an imbedded controls implementation, the programming software is typically some form of "c" such as c or c++, or perhaps in a version of Basic such as T Basic.

In one embodiment, the controller 260 is an MDT Data Acquisition Control Computer. In another embodiment, the controller 260 is a Triangle Research EZWire 1616 that provides integrated, field wiring ready I/O terminals. The Triangle Research EZWire 1616 controller is an embedded programmable logic controller (or "PLC") with operations software downloaded thereon. This PLC is able to perform advanced floating point math, and has 16 digital inputs and 16 digital outputs.

The controller 260 provides digital and analog I/O points with its own power (+24V or +5V) and 0V on a 3-level screwless terminal. In one embodiment, the controller 260 has eight analog inputs and four analog outputs. Every sensor and actuator in a control system can be wired directly to the PLC without requiring additional screw terminal blocks and wire-harnesses. For example, the PLC includes an RS485 pinout cable connector.

The controller 260 further optionally includes an Ethernet port. The Ethernet port may connect to other devices or web servers for control or data up/down loading. The controller 260 additionally includes a back-up battery (not shown).

The controller 260 receives signals from the pressure transducers 242, 244, in real time. In one aspect, the pressure transducers 242, 244 send one signal per second, 100 signals per second, or even more. The controller 260 compares the received pressure values with a pressure threshold value (T) stored in memory. If a pressure reading from one of the pressure transducers 242, 244 exceeds the stored pressure threshold value (T), then the controller 260 sends a signal to the pump 241 to discontinue the pumping of water into the hydrotest tool 120.

Beneficially, the stored pressure threshold (T) represents a value that is less than a burst pressure ($P_B$) of the production tubing 110. The stored pressure threshold (T) is also, of course, below a pressure rating ($P_S$) of the opposing seal cups 126', 126" in the testing tool 120. The controller 260 provides a safety function by preventing pumping pressures from exceeding the pressure rating ($P_B$) of the production tubing 110 and the pressure rating ($P_S$) of the seal cups 126', 126". This automated fluid pressure management removes reliance on the operator who may not properly or timely react to the changing conditions that can arise at a well site during hydrotesting.

It is again noted that if the tubing wall bursts, the integrity of the tubing wall is compromised and the entire string of tubing will most likely fall into the wellbore, possibly many feet down the hole. This would require an expensive fishing expedition.

As an additional feature, the controller 260 has a separate stored pressure value ($P_T$). ($P_T$) is indicative of a desired test pressure for the hydrotest tool 120. This value is entered by the operator.

When the hydrotest tool 120 is in place within the bore 115 of the production tubing 110 and the slips of the cable 137 are in place, then the operator will press the "Start" button to start the sequence of testing the pipe 110. The Start button is associated with a user interface (or "human machine interface") employed by the operator, shown at "O".

The user interface "O" may represent a laptop computer or other portable processing unit used by the operator. Alternatively, "O" may represent a mobile data system as might reside on a company van or the hydrotest truck 130. Alternatively still, "O" might represent a desktop computer residing at the operator's field office or other location. This enables the operator to view pressure signals remotely and to check system functions such as fluid level in the reservoir 245.

Of interest, the system may allow a customer, typically the oil and gas production company, to log into the user interface through a customer portal. This allows the customer to view the progress of the hydrotest process in real time.

Pressing the Start button will activate the pump 241. More specifically, a signal is sent from the user interface "O" to the controller 260. Dashed line 265 is indicative of the signal sent to the controller 260. Line 265 represents a communication line or a communications link between the user interface "O" and the controller 260. The communications link 265 is preferably a wireless communication provided through a cellular network. Alternatively, the communications link 265 may be an Internet connection or a Blue tooth signal. In any event, the communications link 265 enables the operator to activate the pump 241 or to close valves as well as to determine system status. System status includes, for example:

- the state of a plug valve, that is, valve 243 or 247 as being in an open state or in a closed state, or perhaps in an intermediate position;
- the state of a battery, that is, what is the percentage of charge remaining for an on-site battery used to power gauges 246, 248 and pressure transducers 242, 244;
- the water level in the reservoir 245; and
- measurements of pressure transducer 242 and 244.

As the pump 241 moves water (or test fluid) into the hydrotest tool 120, fluid fills the annular void between the mandrel 125 and the surrounding production tubing 110. As this occurs, the pressure transducer 242 or 244 will send signals to the controller 260 representing increased pressure values. Once the pressure value reaches the desired pressure test value ($P_T$), the controller 260 will tell the pump 241 to stop pumping, or at least to hold pressure. The pumping system 240 will then hold pressure in the production tubing for a desired test time ($T_T$). In one aspect, ($P_T$) is 6,000 to 8,000 psig and $T_T$ is 3 to 15 seconds. At the end of ($T_T$), the water is bled out of the production tubing 110 and back into the water reservoir 245. Preferably, this is done automatically and without operator intervention.

As a related feature, in the event one of transducers 242, 244 reaches the stored pressure threshold (T), the water will automatically bleed the test fluid back into the water reservoir 245. As part of this feature, the controller 260 will make sure that the valves 243, 247 are in a full-open position. Alternatively, an E-Kill feature is provided for the user interface "O". Pressing an "E-Kill" button on user interface "O" causes the system to dump the water back into the fluid reservoir 245, such as through use of hose 154 as a bypass hose. As discussed further below, this is done by moving valves in a hydraulic circuit 400 into an open position instantaneously.

During ($T_T$), the controller 260 will monitor pressure readings from the transducer 242 or 244 to confirm that no pressure loss is taking place. If no pressure loss is taking place (or no variation in pressure within a desired range ($\Delta x$) occurs), then pressure is bled from the hydrotest tool 120, returning fluid back to the reservoir 245. Fluid may be backed back out of hose 152, or may be returned through a bypass hose.

Thereafter, the production tubing 110 is lowered into the wellbore as part of the production string, and the process is repeated with a new joint (or a new section of joints) being placed into position over the wellbore. On the other hand, if pressure loss is taking place then a record is made within the memory of the controller 260. Further investigation or analysis may be made of the tubing joint 110 to determine the integrity of the pipe wall and its threads.

It is observed that a hydrotest procedure may also be conducted on pipe joints when the tubing is removed from a wellbore.

Preferably, the controller 260 will operate with custom software, with pressure charting being provided in milliseconds. Additionally, automated leak detection is provided wherein a "$\Delta x$" psi pressure loss (or pressure bleed) from the pumping system automatically alerts the operator of a possible leak. This is done, for example, through an alert signal sent to "O". The alert signal may be sent through communications link 265, or via text message or through any wireless network. In addition, an audible signal may also be provided at the hydrotest truck 130. The signal may represent, for example, a light or a change in light color within the truck 130.

As another feature of the pumping system 240, the user interface "O" may provide for manual override of the controller 260. This may be accomplished, for example, by pressing an "Off" button on the user interface "O". Pressing "Off" returns the system 200 to a purely manual system, requiring the operator to mechanically turn off the pump 241 whenever analog gauges suggest the pressure test value ($P_T$) has been reached. Pressing the "Off" button also stops the automated testing process of the pipe 110.

Yet another feature of the pumping system 240 includes an automated timeout. If the PTO pump 241 is operating to fill the production tubing with water but the target value for test pressure ($P_T$) is not reached after a shutoff time ($T_{SO}$), then the controller 260 will timeout and send a signal to the PTO pump 241 to stop pumping. Alternatively or in addition, the controller 260 will send a signal to cause one or more valves to move, thereby diverting fluid away from the hydrotest tool and back to the fluid reservoir 245. In either event, reaching ($T_{SO}$) is a strong indication of a defective pipe 110.

Still another feature of the pumping system 240 includes the ability to monitor water volume used for each hydrotesting stage. Initially, when the annular space between the mandrel 125 and the surrounding production tubing 110 is filled, several gallons of water (or other testing fluid) are pumped into bore 115. It is understood that after each testing stage, the hydrotest tool 120 stays in the wellbore and awaits the next stand of production tubing 110. When a new stand of tubing 110 is lowered into the wellbore, the hydrotest tool 120 and the water above the lower packer 126" are raised up to the new stand. The pressurization and testing steps are then repeated.

Ideally, very little water needs to be pumped into the hydrotest tool 120 for the next pressure testing stage. The volume may be, for example, less than 0.1 gallons. If more than that is needed, this may be sign that the packers in the hydrotest tool 120 are wearing out and leaking. This is particularly true if the pressure values during prior testing stages show that the tubing stands 110 are water-tight, i.e., "$\Delta x$" psi pressure loss is never met.

In pumping a fluid volume, the operator will know how many gallons the pump will move per pumping revolution. For example, the pump may push 0.035 gallons of water per revolution. If a pump moves $\frac{1}{3}^{rd}$ of a revolution in order to re-pressurize the hydrotest tool 120, then the operator knows that the pump should move about 0.12 gallons of fluid.

The controller 260 may be configured to monitor fluid movement during each stage. Fluid movement may be calculated based on observed pump revolutions or by using a flowmeter. Alternatively, the time it takes to "top off" each stand during pressurization may also be monitored. Those of ordinary skill in the art will understand that there is a relationship between time of pumping, gallons of fluid moved per revolution of pumping, time it takes per revolution of pumping and fluid volume moved. Any "out of norm" readings indicative of fluid use suggest a defective joint of tubing. Repeated "out of norm" readings suggest it is time to change out one or both of the seals 126', 126".

As can be seen, an improved pressure test system 200 is offered herein. Through the use of automation, the pressure-test system 200 is able to monitor the pressure of liquid being injected into a joint of production tubing during the course of well completion or workover operations in a more accurate manner, and specifically through digital pressure transducers. In addition, the pressure-test system 200 is able to control an injection rate of the aqueous test liquid into the production tubing while working off of a set test pressure ($P_T$). Once the test fluid reaches a desired pressure test value ($P_T$) (input into the controller 260), the pumping system 240 will stop pumping for a designated time (through the use of another stored threshold in seconds) ($T_T$) and hold that pressure ($P_T$).

Figure 3A:
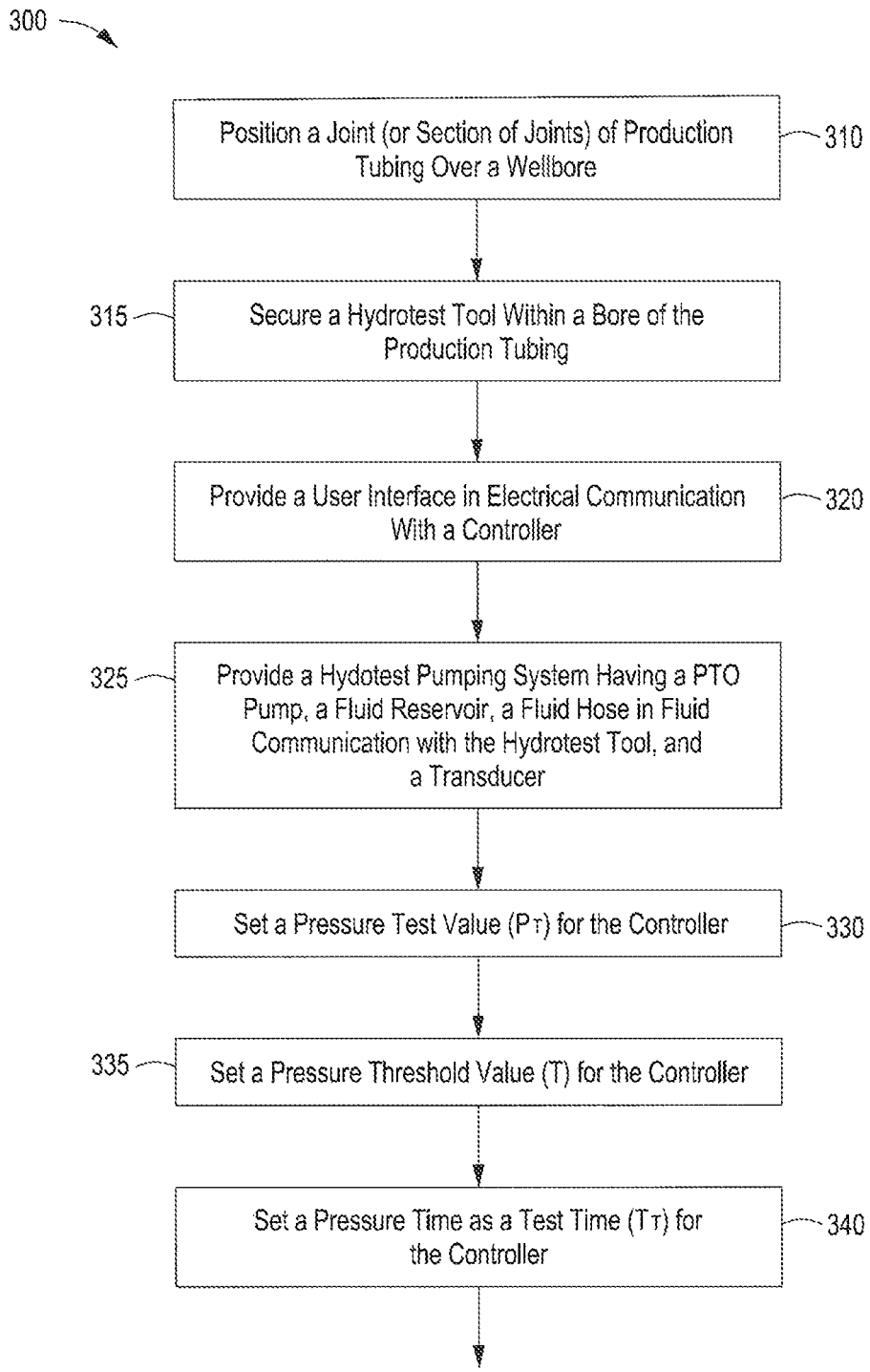
FIGS. 3A-3C represent a single flow chart demonstrating steps for pressure testing a tubular body in accordance with the present invention, in one embodiment.
Figure 3B:
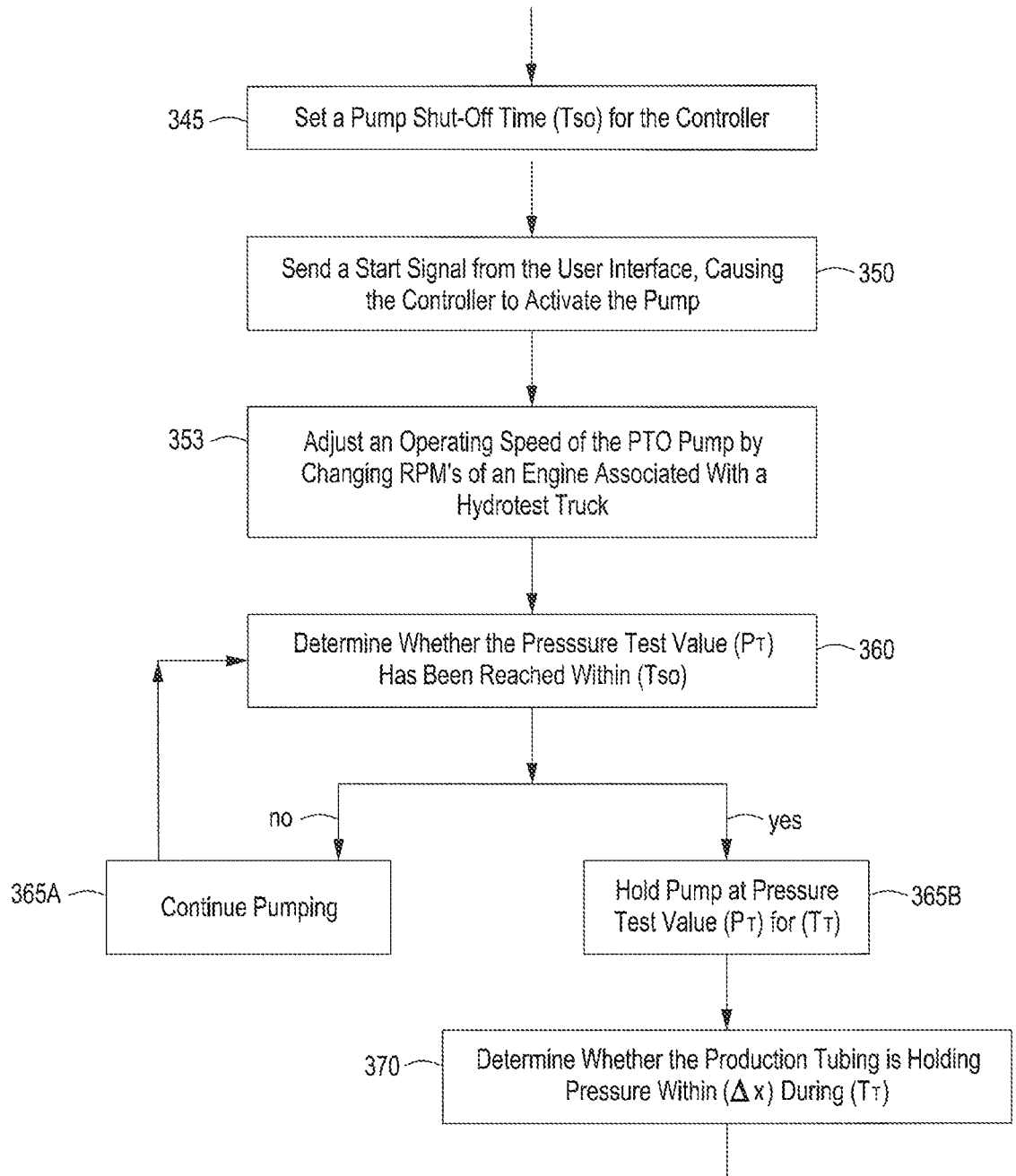
Figure 3C:
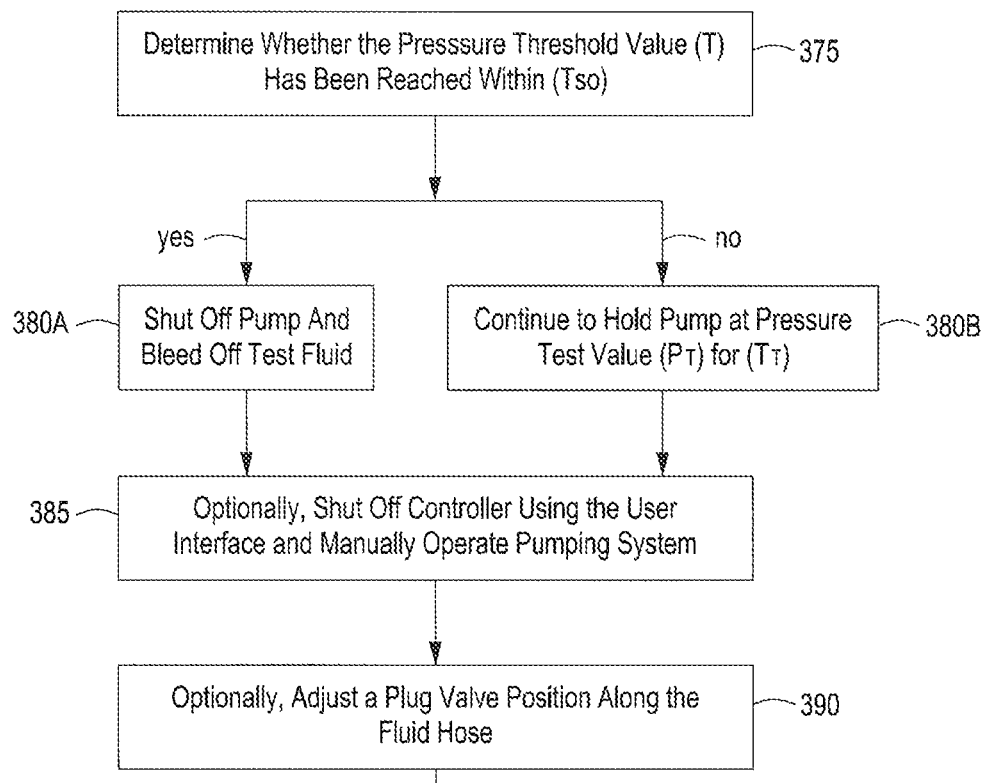

An improved method for pressure-testing tubular products is also offered herein. FIGS. 3A-3C present a unified flow chart demonstrating steps 300 for pressure testing a tubular body in accordance with the present invention, in one embodiment.

The method 300 first includes the step of positioning a joint of production tubing over a wellbore. This is shown at Box 310. The joint may be a section of joints, such as two joints or even three joints threadedly connected together. A section of joints may be referred to as a stand.

The method 300 next comprises securing a hydrotest tool within a bore of the production tubing. This is seen at Box 315. The hydrotest tool will include opposing elastomeric members, or packers, that provide fluid seals at opposing ends of the production tubing bore. The hydrotest tool will also provide a coupling for a hose used to deliver an aqueous test fluid through a mandrel and into the bore of the production tubing for hydrotesting.

The method 300 further includes providing a user interface. This is offered in Box 320. The user interface may be a laptop computer, a computer system provided in a van or in the hydrotest truck, or even a portable smart phone. In any aspect, the user interface is in electrical communication with a controller.

The method 300 additionally comprises providing a hydrotest pumping system.

This is shown at Box 325. The hydrotest pumping system will include a so-called PTO pump. Alternatively, the pump is a variable frequency drive (or "VFD") pump. The hydrotest pumping system will also include a fluid reservoir, at least one fluid hose and a transducer. As described in connection with FIG. 2, the pump will move the aqueous test fluid from the reservoir and through a hose, en route to the hydrotest tool. The transducer monitors pressure in the hose, sending digital signals to the controller in real time during and after pumping.

Optionally, the hydrotest pumping system will also include a diverter valve. The diverter valve is electrically actuated or, alternatively, electraulically actuated, and may be used to control a flow of fluid from the pump to the hydrotest tool. In one aspect, a fluid line extends from the pump to the diverter valve. Test fluid flows through the diverter valve, which is normally-open, and through selected control valves in accordance with signals provided by the controller 260.

The method 300 also provides setting a pressure test value ($P_T$) for the controller. This is seen at Box 330. The value ($P_T$) is a value needed to ensure that the production tubing will hold pressure during later production operations. In one aspect, ($P_T$) is about 7,000 psig, although this is a matter of engineer's need.

The method 300 additionally includes setting a pressure threshold value (T) for the controller. This is offered at Box 335. The value (T) is a pressure level that should not be exceeded during pressure-testing. Value (T) is less than a burst pressure rating ($P_B$) for the pipe.

The method 300 further comprises setting a pressure hold time value ($T_T$). This is a test time for the controller, preferably measured in seconds, wherein hydro-pressure is held in the production tubing. This is seen at Box 340 of FIG. 3B. Preferably, value ($T_T$) is 10 to 15 seconds.

Additionally, the method 300 includes setting a pump shut-off time ($T_{SO}$) for the controller. This is shown at Box 345. The pump shut-off time ($T_{SO}$) is a timeout value. Value ($T_{SO}$) may be, for example 10 to 30 seconds, and more preferably 10 to 15 seconds.

The method 300 further comprises sending a Start signal from the user interface. This is indicated at Box 350. The Start signal causes the controller to activate the pump and to move the diverter valve, such as valve 450 shown in FIG. 4A.

The method 300 then includes adjusting an operating speed of the PTO pump. This is seen at Box 355. In one aspect, the speed is adjusted by changing the RPM's of an engine associated with a hydrotest truck. This is as an alternative to adjusting a position of the plug valve along the hose.

The method 300 further provides determining whether the pressure test value ($P_T$) has been reached. This is provided at Box 360. The controller looks to see if the value $P_T$ has been reached before the pump shut-off time ($T_{SO}$) is achieved. If ($P_T$) is not reached before the controller times out, then the pump continues pumping test fluid and the algorithm returns to the query of Box 360. This is provided at Box 365A. Once ($P_T$) is reached, then the pump is shut off and a pressure test is held for time ($T_T$). This is shown in Box 365B. During time ($T_T$), the pump may stop pumping to see if pressure is held within a range ($\Delta x$).

The method 300 also comprises determining whether the production tubing is holding pressure. This step is done during ($T_T$) as provided for in Box 365B. If pressure drops below a differential value ($\Delta x$), then the operator knows that the production tubing is not holding pressure per the step of Box 370. This may be due to a pinhole leak, or due to a faulty thread connection, or perhaps due to micro-cracks along the metal caused by fatigue. In one aspect, ($\Delta x$) is 50 psi. Alternatively, ($\Delta x$) is 100 psi, or 200 psi.

In any instance, the operator will inspect the production tubing and possibly reject the production tubing and move on to a next joint. Of greatest importance, a digital record is kept as to whether each joint successfully held pressure. This is of value to the pipe company and to the service company, demonstrating to the operator of the well that the production tubing is commercially fit.

During testing, the method 300 provides for determining whether the pressure threshold value (T) has been reached. Specifically, the pressure value (T) has been reached before the system times out ($T_{SO}$). This is offered in Box 375. If value (T) has been reached, then the controller sends a signal to shut off the pump, and fluid is automatically bled off through the hose and back into the fluid reservoir. This is seen in Box 380A. On the other hand, if value (T) has not been reached, then the system will continue to hold pressure at the test value ($P_T$) for time value ($T_T$). This is indicated at Box 380B.

It is understood that "discontinue pumping" or "shutting off the pump" may include moving a diverter valve or downstream control valves to re-route fluid away from the hydrotest tool and back to the fluid reservoir. In this instance, the pump never actually stops running unless the system is moved to a Manual Mode or Stop Mode. This allows the test company to always be diverting at a good flow rate back to the fluid tank in order to save time during the pressure test.

After the pressure has been held for the pre-set test time ($T_T$), the controller will then relay a signal to dump the pressure back into the holding reservoir positioned on the truck, resulting in a near zero PSI within the production tubing. This allows the rig crew to make a connection with the tubing string in the wellbore. It is understood that "dumping" pressure may mean returning less than half a gallon of water back into the reservoir.

Once the connection with the tubing string is made, the rig crew will use the on-site rig to bring down the stand (such as two joints of pipe) to the workover rig floor. After this is achieved, a winch (mounted on the hydrotest truck) is used to fish the weighted bars, seals, and slip assemblies that make up the hydrotest tool. Once a top portion of the hydrotest tool is brought to the rig floor, a gun (high pressure fitting), is inserted into the top portion and the section below is again pressurized to a certain operator specified PSI ($P_T$).

As an optional step in the method 300, the operator may shut off the controller using the user interface. This is seen at Box 385. The operator may press an "Off" button on the user interface, allowing the pumping system to be manually operated. This is described further below as either a Manual Mode or as a Stop Mode.

As an additional optional step, the operator may adjust a safety valve position along the fluid hose. This is provided at Box 390. In one aspect, adjusting the safety valve position means that a plug valve is moved to a closed position when pressure value (T) is reached. In another aspect, adjusting the safety valve position means that the safety valve is moved to an intermediate position (partially between its open position and its closed position) in order to reduce a rate of fluid moving into the production tubing. In either case, the pump should also be shut off and a valve to a bypass line is opened when the system is in Stop Mode.

Figure 4A:
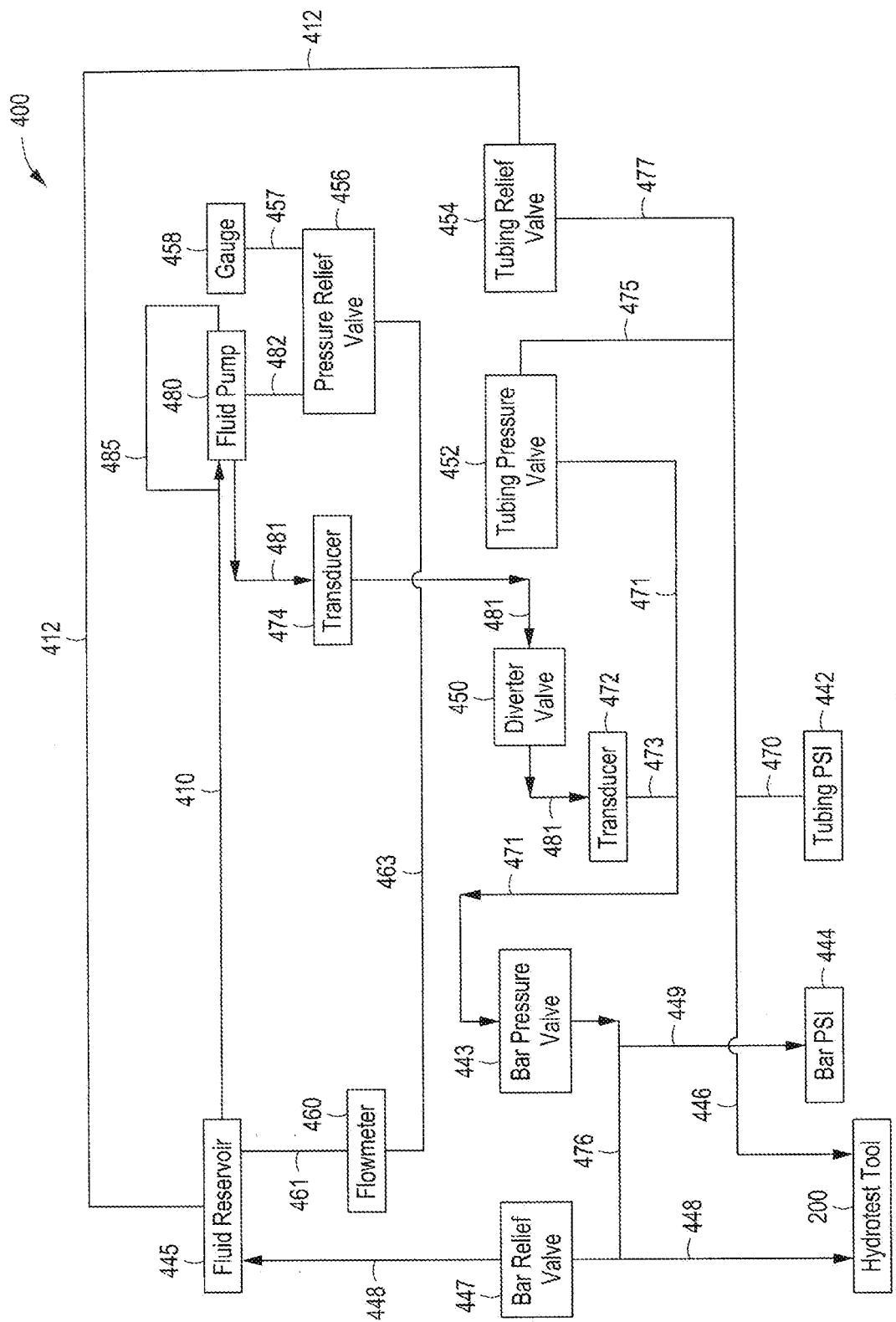
FIG. 4A is a fluid circuit diagram, representing one illustrative way of implementing the method of the present invention.

FIGS. 2 and 3 discuss the electrical monitoring and control signals used in the system 200 and method 300 herein, in their various embodiments. FIG. 4A is offered to demonstrate a hydraulic circuit 400, in one embodiment. The hydraulic circuit 400 governs the movement of fluids into and out of the hydrotest tool 120.

Along with the controller 260, the hydraulic circuit 400 provides for a controlled discharge of water from a discharge pump by selectively opening and closing a 4-20 PVG valve, referred to as a diverter valve. The diverter valve is shown at 450 and is discussed below. The controller 260 keeps data acquisition of pressure and water usage during test cycles. At any given time, data acquisition may include valve positions, pressures, differential pressures, fluid volume pumped for each test, hydraulic pressures, hydraulic temperatures, pump RPM's, fluid reservoir volume, tubing pressure and bar pressure.

The system 200 may perform between 130 and 250 pressure tests by pumping water into stands of pipe. The hydrotest tool 120 will hold pressure in each stand, sequentially, until the desired pressure is reached and then will hold that pressure. If there is a pressure loss during the test, then this indicates a joint leak. All hydraulic and water pressure sources are maintained outside of the truck cab for safety reasons.

FIG. 4A first demonstrates a fluid reservoir 445. The fluid reservoir 445 corresponds to fluid reservoir 245 discussed above. The fluid reservoir 445 may be a 750 gallon stainless steel tank. The fluid reservoir 445 provides test fluid, preferably potable water, to a fluid pump 480.

The hydraulic circuit includes four control valves 443, 447, 452, 454, in addition to the diverter valve 450. These valves are selectively opened and closed in response to control signals from the controller 260. Each of the valves 443, 447, 452, 454, 450 is preferably a linear, spring-actuated valve rated to 15,000 psi. Such valves are available from Jetstream of Houston, LLP. Valves 443, 447, 452, 45 reside in a normally-closed position, while the diverter valve 450 resides in a normally-open position.

While the valves 443, 447, 452, 454 are preferably spring valves, it is noted that any valve that uses a biasing member to control flow may be used. Such valves include dart valves, ball valves, gate valves, knife valves, poppet valves and plug valves.

The valves 443, 447, 452, 454 are controlled by pressure switches that run off of hydraulic fluid. It is understood that the valves 443, 447, 452, 454 may alternatively be run off of air or electric power. In one aspect, the valves 443, 447, 452, 454 can be toggled open or closed by pressing on valve icons on the control HMI (human machine interface) "O".

In operation, the testing company enters a pressure threshold value (T) before actuating the appropriate valves and beginning testing. This is a maximum pressure value for the pipe. The operator also enters a designated pressure test value ($P_T$), which is the hydraulic pressure value to be applied to the internal bore of the pipe. Finally, the operator enters a pressure testing time ($T_T$). This is the time in which the pressure ($P_T$) is to be held and observed. Setting these parameters may be referred to as the configuration phase. A shut-off time ($T_{SO}$) is also entered.

The parameters may be set by a configuration field next to the START button on the control HMI "O". At this point, the valves 443, 447, 452, 454 are open and the pump 480 is not running.

Once the Start signal is sent in accordance with Box 350, the controller 260 moves the valves 443, 447, 452, 454 into their respective correct start positions. When a test cycle is started, a tubing relief valve 454 and a bar relief valve 447 are closed. At the same time, a tubing pressure valve 452 and a bar pressure valve 443 are opened.

As the system 400 operates, test fluid is moved from the fluid reservoir 445 along fluid feed hose 410, and into the fluid pump 480. The pump 480 is preferably a PTO pump as described above in connection with high pressure pump 241. The pump 480 may be, for example, a Kerr pump having a 1" plunger and 3.5" stroke. This pump can move 0.036 gallons (0.136 liters) per stroke. Alternatively, the pump 480 may be a variable frequency drive (or "VFD") pump.

The pump 480 moves the test fluid out through test fluid line 481 and to the diverter valve 450. Upon pressing the START button, the diverter valve 450 is fully open to allow pressure to reach 90% of the target pressure ($P_T$). Pressure is then allowed to creep up to target pressure ($P_T$). Once the target pressure ($P_T$) is reached, (typically within 2 to 3 seconds), the pressure is held for between 1 and 60 seconds, and preferably 5 to 10 seconds. Then, the pump 480 will stop. After the pump 480 stops, the tubing pressure valve 452 and the bar pressure valve 443 (referred to as discharge valves) are closed and the tubing relief valve 454 and the bar relief valve 447 (referred to as bleed valves) are opened. The diverter valve 450 may optionally be closed.

Upon passing through the diverter valve 450, fluid passes along line 473 and enters line 471, wherein the fluid is delivered through a bar pressure valve 443. Optionally, pressure transducers 472, 474 are in fluid communication with hose 481 on an opposing side of the diverter valve 450. The transducers 472, 474 monitor fluid pressure during pumping by the pump 480. More specifically, the controller 260 monitors pressure readings from the transducers 442 or 444 to confirm that no pressure loss is taking place. The controller 260 records all pressures.

Fluid is pumped through the diverter valve 450, through line 471, and on to a bar pressure valve 443. The bar pressure valve 443 may be, for example, a one-way valve that prevents test fluid from backing back into the fluid pump 480. It is noted that the pumping system upstream of the diverter valve 450 may be referred to as the low pressure side, while the pumping system downstream of the diverter valve 450 may be referred to as the high pressure side. It is also noted that while certain claims herein may refer to "a first fluid hose" that transmits test fluid into a hydrotest tool, such term may include the use of one or more fluid hoses in fluid communication with one another, and one or more valves along the fluid hoses, for delivering the test fluid.

Upon passing through the bar pressure valve 443, test fluid moves through lines (or fluid hoses) 449 and 446, and into the hydrotest tool 200. More specifically, fluid is injected into the mandrel 125 of the hydrotest tool 200. Thus, lines 449, 446 are indicative of hose 152 in FIG. 2. In addition, fluid may optionally be pumped through lines (or fluid hoses) 476 and 448, and into the hydrotest tool 200. Lines 476, 448 are comparable to hose 154 in FIG. 2.

The system 200 ultimately uses two pressure hoses 448, 446 that connect to a pressure gun (not shown). The pressure gun connects to the pressure head 122 on top of the mandrel 125 (or bar tools) that are run inside of the tubing 110.

Teeing off of fluid hose 476 is line 449. At the end of line 449 is a bar psi gauge 444. Preferably, the gauge is a Totco gauge rated to 15,000 psi. Gauge 444 may be gauge 242 from FIG. 2. Alternatively, gauge 444 may be a pressure gauge residing at connection 128.

FIG. 4A also shows a tubing pressure valve 452 and a tubing relief valve 454. These are optional back-up valves used in the hydrotest fluid circuitry 400. As noted, when a test cycle is started, the tubing relief valve 454 and the bar relief valve 447 are each closed. At the same time, the tubing pressure valve 452 and the bar pressure valve 443 are opened. Test fluid is directed into the hydrotest tool 200 through the bar pressure valve 443 and, optionally, also through the tubing pressure valve 452.

The tubing pressure valve 452 may also be a linear, spring-actuated valve rated to 15,000 psi. The valve 452 resides in a normally-closed position. If a threshold pressure along hose 471 is exceeded, fluid passes through tubing pressure valve 452 and into the fluid return hose 446.

When a test cycle is completed, the bar pressure valve 443 and the tubing pressure valve 452 are closed. At the same time, the tubing relief valve 454 and the bar relief valve 447 are opened, allowing fluid to return to the fluid reservoir 445 in preparation for a next test cycle.

Of interest, fluid hose 476 tees off of fluid hose 448, and connects to the bar relief valve 447. The bar relief valve 447 may also be a linear, spring-actuated valve rated to 15,000 psi. The valve 447 resides in a normally-closed position. The bar relief valve 447 controls the movement of testing fluid from the hydrotest tool 200 back into the fluid reservoir 445. The bar relief valve 447 is comparable to valve 247 from FIG. 2.

Fluid in hoses 475 and 446 is merged into hose 477, where the testing fluid passes through the tubing relief valve 454. The tubing relief valve 454 may also be a linear, spring-actuated valve rated to 15,000 psi. The valve 454 resides in a normally-closed position until opened by the controller to relieve fluid pressure in the production tubing.

In one aspect, pressure testing of the tubular products 110 may be conducted by sending all test fluid through the tubing pressure valve 452 while the bar pressure valve 443, the bar relieve valve 447 and the tubing relief valve 454 are closed. In this instance, the tubular products 110 may be filled independent of the bars making up the hydrotest tool 120.

Once a tubular product has passed the pressure test, the tubing pressure valve 452 is closed and the tubing relief valve 454 is opened. This may be done automatically using the Auto Mode function of the system 200.

Of interest, a tubing PSI gauge 442 is provided along the return hose 446. The tubing PSI gauge 442 is in fluid communication with the return hose 446 by means of line 470.

Additional features of the fluid circuitry 400 are optionally provided. These features generally relate to operation of the pump 441.

First, a bypass line 485 is provided. The bypass line 485 tees off of the fluid feed hose 410 and circles back to an inlet of the pump 480. The bypass line 485 is a safety feature in the event of blockage along feed line 410 or at the inlet to the fluid pump 480.

A separate bypass line 461 is provided off of the fluid reservoir 445. Fluid may exit the fluid reservoir 445 through line 461 where it passes through a flow meter 460. The flow meter 460 is an optional way of measuring fluid that is moved through the system during a pump cycle. In other words, the flow meter 460 is a volume calculator.

The flow meter 460 represents a module that is part of the algorithm of the controller 260. Fluid measurement is a way of confirming that the system is fluid tight, or whether fluid may be leaking through the seal cups during cycles. The determination of volume is at the fluid end of the hydrotest truck 130.

From the volume calculator 460, fluid moves along hose 463 until it reaches a pressure relief valve 456. The pressure relief valve 456 represents a 10,000 to 20,000 psi adjustable valve. In one aspect, valve 456 is actually a pair of valves operating in parallel. In either arrangement, if fluid exceeds a threshold pressure value, valve 456 opens and returns fluid to the fluid pump 480 by means of hose 482.

The valve 456 monitors pressure within the pumping system 400. Preferably, a manual, analog pressure gauge is associated with the valve 456, allowing the operator to view system 400 pressure through visual observation. Line 457 communicates valve 456 with the pressure gauge 458.

The fluid circuitry 400 enables an automated system in which the controller 260 controls the pump 480 and a series of valves in order to achieve a target pressure within the mandrel of a hydrotest tool 200.

When the circuitry 400 has reached the target pressure threshold ($P_T$), the fluid diverter 450 switches positions to divert flow back to the fluid reservoir 445. In this instance, water is recirculated with the pump remaining on. Next, the system 400 will equalize and the time variable or hold time (T), representing the duration in which the system 400 will hold the pressure ($P_T$). Once achieved, all four valves, that is, the tubing pressure valve 452, the tubing relief valve 454, the bar pressure valve 443 and the bar relief valve 447 will all actuate open and bleed off pressure instantly back to the fluid reservoir 445.

It is noted that each of pressure gauges 442, 444, 472, 474 and 458 is a pressure transducer. Preferably, all transducers 442, 444, 472, 474 and 458 have manual gauges as well so that if the Auto Mode fails, accurate pressure readings can still be taken.

It is also observed that when the volume calculator 460 is used, the volume calculator 460 will measure the total volume of fluid pumped during each Start sequence. The measurement stops as soon as the target pressure threshold ($P_T$) is reached. The total is then charted and monitored in real time to determine volume loss, which aims to identify tubing defects. This, in turn, allows the hydrotest operator to identify a section or sections (usually in stands which are two joints of tubing where a defect exists. In other words, excess fluid volume is another way of detecting defective pipe in addition to a failure to hold pressure within ($\Delta x$).

In one aspect, the hydrotest system 200, with fluid circuitry 400, can operate in five modes. Those are:

Calibration Mode: The calibration mode uses programming to determine the pump speed needed to achieve a target pressure. Also, the calibration mode sets sensors to zero and confirms their operation. Next, the system tests the diverter valve, the discharge valves and the bleed valves to see if they are working properly. The system may also go through a health check to test its own functionality as well as the truck's hydraulic system. All parameters of the Start sequence are interrogated as a final check.

Auto Mode: This allows the system 200 to run in the configuration phase and then test phase per FIG. 3. In the Auto Mode, the valves 452, 454, 443, 447 are automatically positioned in the right sequence when the Start is initialized. The diverter valve 450 opens and sends fluid to the appropriate lines, i.e., lines 446 and/or 448. The pump speed automatically increases to achieve the target test pressure ($P_T$). After this, the diverter valve 450 closes and pressure is held on the bars and tubing stand being tested. Once pressure is held for the test time ($T_T$), the system bleeds off by opening the bar relief valve 447 and, optionally, the tubing relief valve 454. The system 200 passes or fails the joint or joints of tubing based off any inputted pressure differential ($\Delta x$). Alternatively, a joint or joints of tubing may fail based on a fluid volume limit being out-of-range or a maximum pump time (T) being exceeded.

Manual Mode: This will interrupt the Auto Mode and cause the pump 480 to stop pumping. All valves will open. For this setting, a joystick is provided in the truck 130. The joystick allows the operator to manually control pump speed. In addition, the operator may control the positions of all four valves 452, 454, 443, 447 as well as the diverter 450 using toggle switches. In addition, the operator may control the winch, that is, spooling and unspooling the cable 137.

Stop Mode: This will interrupt the Auto Mode and cause a Stop event. This option will only appear on the HMI "O" when the system 200 is in the testing phase. A stop event is caused by pressing a Stop button that appears alongside the Start button while the testing phase is in progress. This too will cause the pumping to stop downstream of the diverter valve 450. This may be done by closing the diverter valve 450, or alternatively by opening the diverter valve 450 first, and then the discharge valves 443, 452. The bleed valves 447, 454 are then opened as well. Note that this does not kill the PTO pump; it just instantly bleeds off pressure on all lines.

E-Kill Mode: This will interrupt all other modes. An E-Kill event is caused by pressing the E-Kill Button on the HMI "O." This will disconnect power to the diverter valve 450, causing it to stay in an open position to allow flowback to the fluid reservoir 445. In addition, the bar pressure valve 443 and the bar relieve valve 447 are moved into their open positions. Optionally, the tubing pressure valve 452 and the tubing relief valve 454 are also opened. Of importance, power to the PTO pump is terminated and input to the HMI "O" is disabled. All HMI and hydraulic functions on the truck 130 are disabled.

During the Auto Mode, the test process repeats itself until all joints of pipe to be run into the wellbore are tested. The system 200 will pass or fail a joint on the following criteria:

The pump time has exceeded the test time ($T_T$);

A collar leak or pin hole is detected; or

The fluid volume input has been exceeded.

In either the Auto Mode or the Manual Mode, the Human-Machine Interface may comprise an alert system. Specifically, the alert system informs the operator whether pressure output into the hydrotest tool is within ($\Delta x$) or has exceeded ($\Delta x$). In one aspect, the alert system includes a pressure indicator light. The pressure indicator light is green when the pressure output is below ($\Delta x$), but turns red if the pressure output meets or exceeds ($\Delta x$). The ($\Delta x$) readings may be taken by transducer 472 shown in FIG. 2.

Figure 4B:
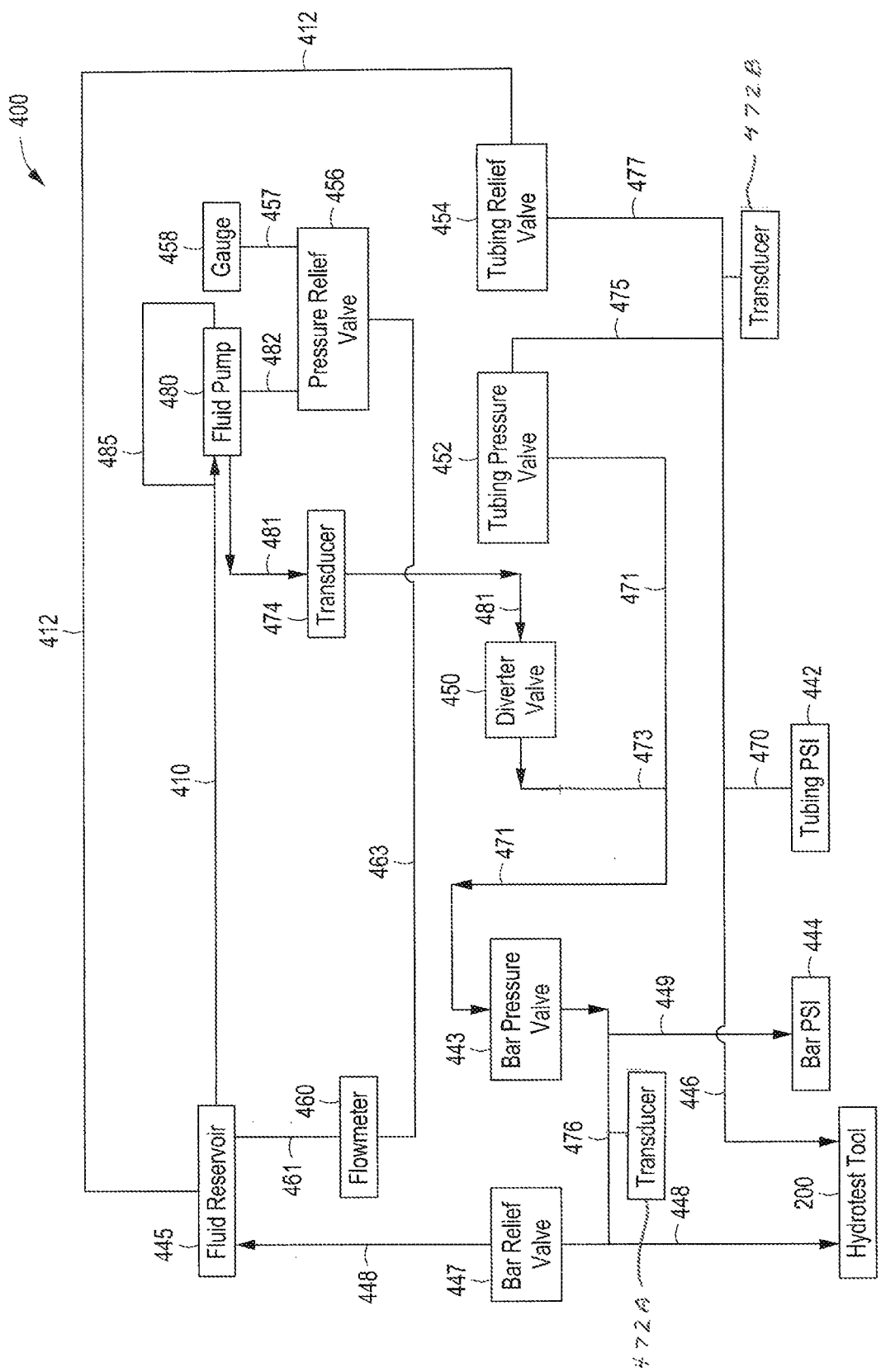
FIG. 4B is another fluid circuit diagram, representing o second illustrative way of implementing the method of the present invention.

FIG. 4B is another fluid circuit diagram, representing o second illustrative way of implementing the method of the present invention. In FIG. 4B, the transducer 472 adjacent the diverter valve 450 has been removed. In its place, a first transducer 472A is placed between the bar pressure valve 443 and the bar relief valve 447. A second transducer 472B is placed between the tubing pressure valve 452 and the tubing relief valve 454.

The first transducer 472A measures pressure between the bar pressure valve 443 and the bar relief valve 447. The transducer 472A makes sure the system 400 does not overpressure on that side of the truck. Similarly, the second transducer 472B measures pressure between the tubing pressure valve 452 and the tubing relief valve 454. Every test passes or fails based on the tubing pressure reading from transducer 472B.

In the arrangement of FIG. 4B, pressure readings 442 and 444 become optional.

As can be seen, an improved hydrotest system is provided. In addition, a novel method for pressure-testing a tubular body such as a stand of production tubing is provided. It is understood that the tubular body may also be a stand of wellbore casing or a joint or section of transport pipeline. While it will be apparent that the inventions herein described are well calculated to achieve the benefits and advantages set forth above, it will be appreciated that the inventions are susceptible to modification, variation and change without departing from the spirit thereof.

What is claimed is:

1. A pressure-testing system for a tubular product, comprising:
a controller;
a user interface, wherein the controller is in electrical communication with the user interface;
a test fluid;
a fluid reservoir configured to contain the test fluid;
a first fluid hose having a first end configured to receive the test fluid from the fluid reservoir, and a second end configured to deliver the test fluid to a pressure head in a hydrotest tool and into the tubular product;
a first fluid relief valve along the first fluid hose;
a fluid pump configured to move the test fluid from the fluid reservoir through the first fluid hose;
a transducer configured to send signals to the controller indicative of pressure within the first fluid hose for pressure-testing of the tubular product;
a second fluid hose having a first end in fluid communication with the pressure head, and a second end in fluid communication with the fluid reservoir; and a second fluid relief valve along the second fluid hose; and wherein the controller is programmed to:
  (i) in response to an operator initiating a Start sequence to automatically, (a) increase a pump speed of the pump to pump fluid into the first fluid hose and into the second fluid hose, and (b) close the first fluid relief valve and the second fluid relief valve to hold pressure in each of the first fluid hose and the second fluid hose during a test time ($T_T$).

2. The pressure-testing system of claim 1, wherein:
the user interface provides a "Start" function enabling an operator to initiate a fluid pump operation for the pressure-testing of a joint of production tubing in an Auto Mode as the Start sequence; and
the controller is further programmed to:
  (ii) store a pressure threshold value (T);
  (iii) store a pressure hold value as the test time ($T_T$);
  (iv) store a pressure test value ($P_T$) such that when pressure in the first fluid hose reaches ($P_T$), the controller sends a signal to the fluid pump to hold pressure at ($P_T$) for the test time ($T_T$);
  (v) detect whether a pressure loss of ($\Delta x$) occurs during test time ($T_T$); and
  (vi) in the event the pressure loss of ($\Delta x$) occurs, record the event as a pressure fail and send an alert to the operator.

3. The pressure-testing system of claim 2, wherein:
the tubular product is a stand of joints of production tubing;
the test fluid is an aqueous fluid;
the pressure threshold value (T) is less than a burst pressure ($P_B$) of a joint of the production tubing; and
the controller comprises memory that charts pressure history during pressure testing of each stand.

4. The pressure-testing system of claim 2, wherein the controller is further programmed to:
  (vii) in the event the pressure loss of ($\Delta x$) does not occur during the test time ($T_T$), send a signal to open the first fluid relief valve of the hydrotest tool, bleed the test fluid back into the fluid reservoir, and record the event as a pressure pass.

5. The pressure-testing system of claim 3, wherein:
the pressure-testing system further comprises a diverter valve residing along the first fluid hose configured to receive signals from the controller to move a position of the diverter valve between an open position and a closed position;
the controller is further programmed to, after each Start sequence:
  (viii) in the event a pressure loss of ($\Delta x$) does not occur during the test time ($T_T$), send a signal to (a) move the diverter valve to prevent fluid from being pumped into the first fluid hose and the second fluid hose, and (ii) open the first fluid relief valve and the second fluid relief valve to bleed test fluid back into the fluid reservoir.

6. The pressure-testing system of claim 5, wherein the pump continues to run after the first fluid relief valve and the second fluid relief valve are opened.

7. The pressure-testing system of claim 3, further comprising:
a user interface by which the operator may (i) set pressure threshold value (T), (ii) set pressure test value ($P_T$), (iii) set test time ($T_T$), (iv) set ($\Delta x$); and
the user interface provides a "Start" function enabling the operator to initiate pump operation for the pressure-testing of a joint of production tubing in an Auto Mode as the Start sequence, and an "Off" function enabling the operator to manually operate the pump in a Manual Mode without the controller.

8. The pressure-testing system of claim 3, wherein the controller is further configured to send a signal to the diverter valve to move the diverter valve to a position that prevents fluid from being pumped into the first fluid hose and the second fluid hose in the event the transducer sends signals to the controller indicating that the pressure threshold (T) has been reached.

9. The pressure-testing system of claim 3, wherein the controller is programmed with a shut-off time ($T_{SO}$), wherein in the event the pump has been pumping for the shut-off time ($T_{SO}$) without reaching test pressure ($P_T$), the controller sends a signal (i) to the pump to discontinue pumping, or (ii) to the diverter valve to move to a position that prevents fluid from being pumped into the tubing line and the bar line, or (iii) both.

10. The pressure-testing system of claim 9, wherein the controller is further programmed (iv) to send an alert to an operator when pressure threshold (T) has been reached.

11. The pressure-testing system of claim 3, wherein the controller is further configured to:
  (ix) receive signals indicative of volume of test fluid pumped into the hydrotest tool during a pumping stage, and record those signals.

12. The pressure-testing system of claim 11, wherein:
the tubular product is a stand of production tubing;
the signals indicative of volume of test fluid comprise (i) signals from a flow meter, (ii) signals from the pump representing time of pumping, (iii) signals from the pump representing revolutions during pumping, or (iv) combinations thereof; and
the signals indicative of volume of test fluid pumped are recorded as a function of time during pressure testing of multiple stands.

13. The pressure-testing system of claim 3, wherein:
the first fluid hose is a tubing hose configured to deliver fluid under pressure into the joints of production tubing;
the first fluid relief valve is a tubing relief valve;
the second fluid hose is a bar line configured to deliver fluid into one or more bars in order to set the one or more bars within the joints of production tubing prior to testing;
the second fluid relief valve is a bar relief valve;
and wherein the controller is further configured to:
  open a bar pressure valve in response to initiating the Start function, and close the bar relief valve, allowing test fluid to be pumped through the bar line and into the bars, and
  close the bar pressure valve in the event a pressure loss of ($\Delta x$) does not occur during the test time ($T_T$), and to bleed test fluid through the bar relief valve and back into the fluid reservoir along the bar line.

14. The pressure-testing system of claim 13, wherein the controller is further configured to:
  open a tubing pressure valve in response to initiating the Start function, and close the tubing relief valve, allowing test fluid to be pumped through the pressure head and into an annular area between the one or more bars and the surrounding joints of production tubing for testing; and
  closes the tubing relief valve and the bar relief valve to hold pressure in each of the tubing line and the bar line in the hydrotest tool at pressure test value ($P_T$) during test time ($T_T$).

15. The pressure-testing system of claim 14, wherein the transducer is a first transducer, and resides between the tubing pressure valve and the tubing relief valve.

16. The pressure-testing system of claim 15, further comprising:
a second transducer that resides between the bar relief valve and the bar pressure valve.

* * * * *